United States Patent
White et al.

(10) Patent No.: US 10,118,471 B1
(45) Date of Patent: Nov. 6, 2018

(54) TONNEAU COVER CONCEAL AND DIVIDE SYSTEM

(71) Applicant: Ford Global Technologies, LLC, Dearborn, MI (US)

(72) Inventors: Kendra White, Redford, MI (US); Pattrick Loew, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/660,111

(22) Filed: Jul. 26, 2017

(51) Int. Cl.
*B60J 7/14* (2006.01)
*B60J 7/19* (2006.01)

(52) U.S. Cl.
CPC ............... *B60J 7/141* (2013.01); *B60J 7/198* (2013.01)

(58) Field of Classification Search
CPC .................................. B60J 7/141; B60J 7/198
USPC .... 296/100.06, 100.07, 100.08, 100.09, 37.6
See application file for complete search history.

(56) References Cited

U.S. PATENT DOCUMENTS

| | | | |
|---|---|---|---|
| 6,039,379 | A | 3/2000 | Jordan |
| 6,217,103 | B1 | 4/2001 | Schultz et al. |
| 9,346,416 | B1 | 5/2016 | Kim |
| 9,463,751 | B1 | 10/2016 | Grubenhoff |
| 9,487,070 | B2 | 11/2016 | Xu |
| 2003/0184115 | A1* | 10/2003 | Armstrong ................. B60J 7/08 296/100.06 |
| 2009/0250962 | A1 | 10/2009 | Polewarczyk et al. |
| 2012/0161470 | A1* | 6/2012 | Castillo ..................... B60P 7/10 296/183.1 |
| 2016/0167718 | A1 | 6/2016 | Wilson |

* cited by examiner

*Primary Examiner* — Joseph D. Pape
(74) *Attorney, Agent, or Firm* — Carlson, Gaskey & Olds, P.C.

(57) ABSTRACT

A vehicle cargo area is disclosed that includes support brackets supported on sides of the vehicle cargo areas. The support brackets are movable between a first position holding a cover above the cargo area and a second position enabling movement of the cover to partition portions of the cargo area.

14 Claims, 6 Drawing Sheets

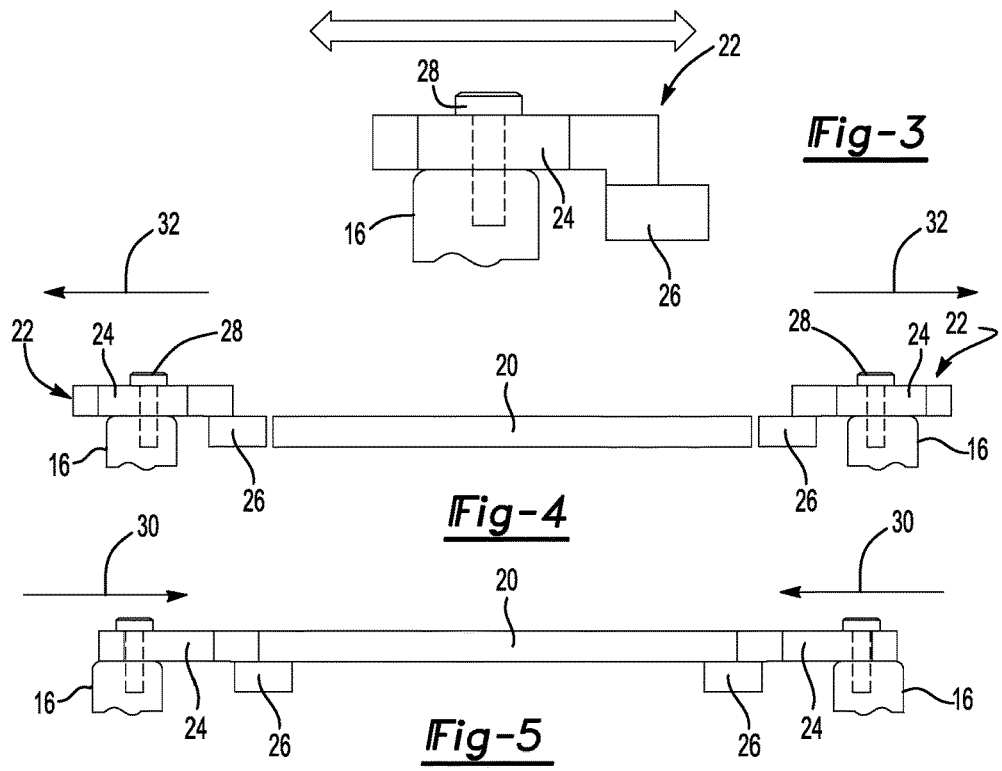
*Fig-3*
*Fig-4*
*Fig-5*
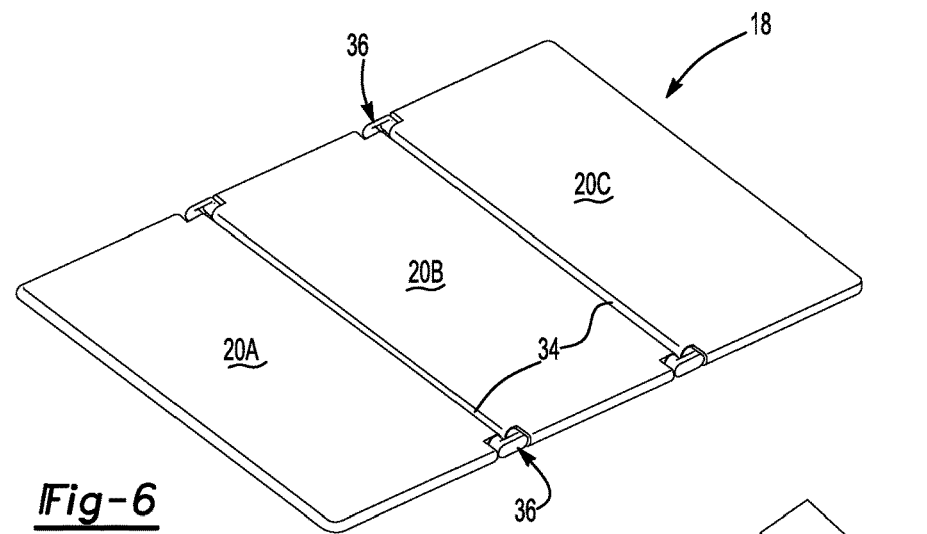
*Fig-6*
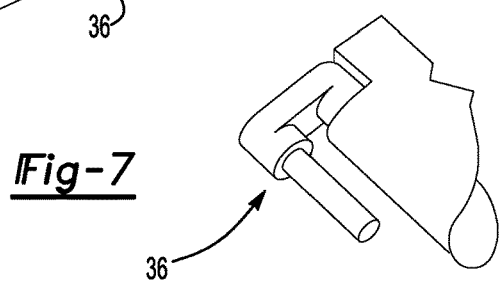
*Fig-7*

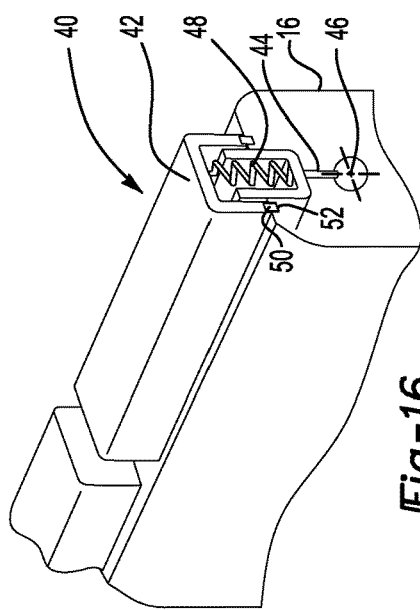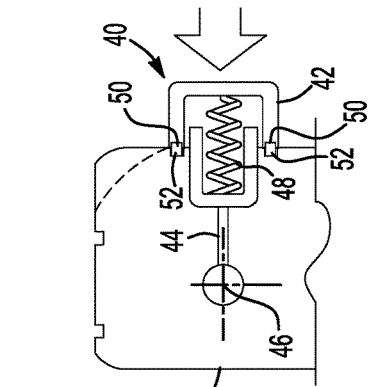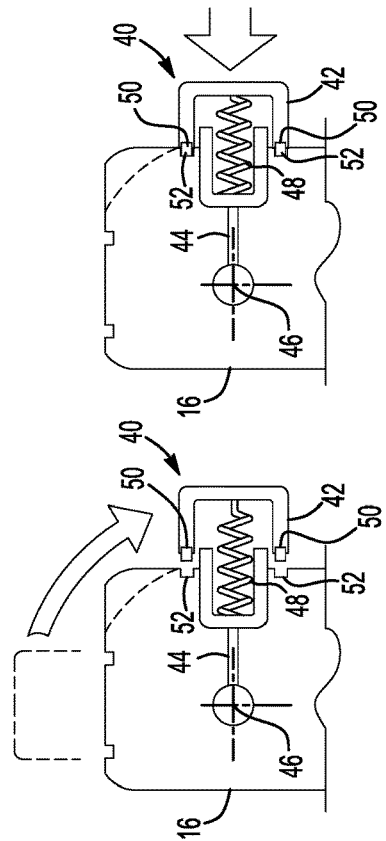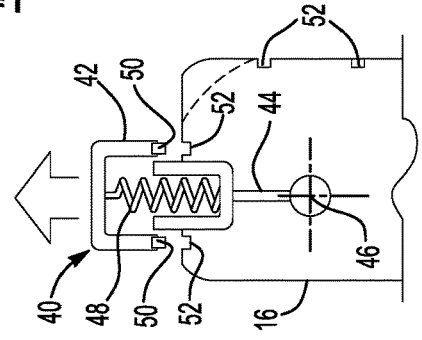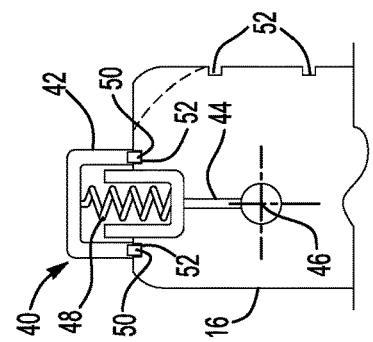

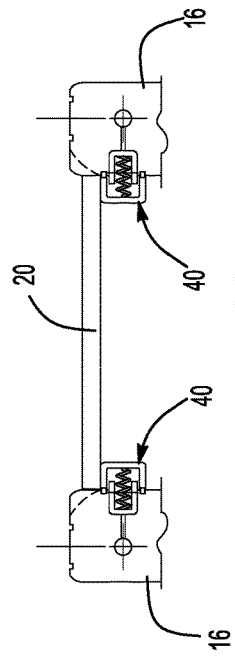
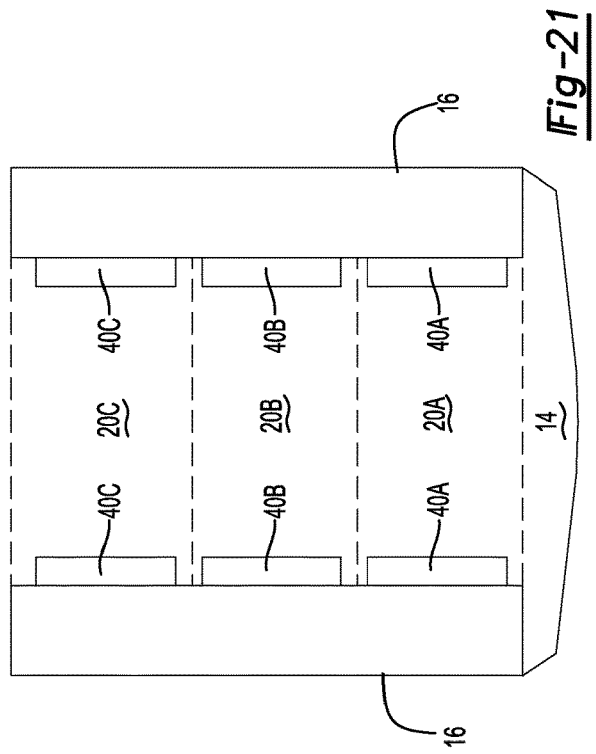
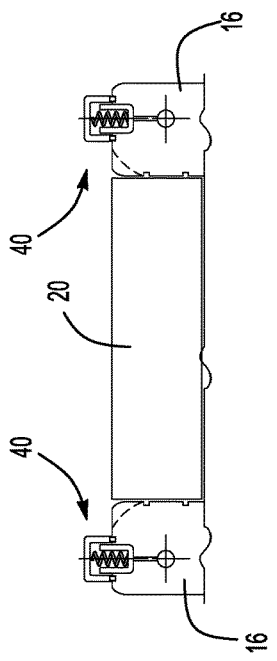
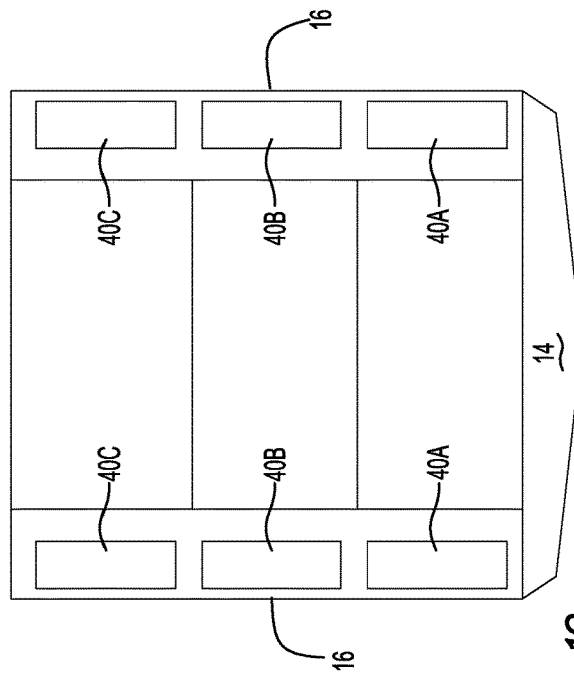

TONNEAU COVER CONCEAL AND DIVIDE SYSTEM

TECHNICAL FIELD

This disclosure relates to a cover for a pick-up truck bed.

BACKGROUND

A pick-up truck includes a truck bed for storing and transporting cargo of various sizes. The open nature of the truck bed means that items are susceptible to theft. Tonneau covers are sometimes provided to conceal items within the truck bed. The tonneau cover complicates access to items. In some instances, it is desired to conceal some items while leaving other items easily accessible within the truck bed. Automotive suppliers and manufactures continue to seek improvements to reduce cost, weight, increase efficiencies and simplify manufacture.

SUMMARY

A tonneau cover system for a truck bed according to an exemplary aspect of the present disclosure includes, among other things, a cover and a support bracket disposed on each side of the cover and movable between a first position supporting the cover above a truck bed and a second position enabling movement of the cover into the truck bed.

In a further non-limiting embodiment of the foregoing tonneau cover system, wherein the cover comprises a plurality of separate cover sections secured to each other with a hinge.

In a further non-limiting embodiment of the foregoing tonneau cover system, wherein the hinge comprises a U-pin such that adjacent cover sections are foldable onto each other.

In a further non-limiting embodiment of the foregoing tonneau cover system, wherein the hinge comprises a flexible member extending between cover sections.

In a further non-limiting embodiment of the foregoing tonneau cover system, wherein at least one of the cover sections includes a lock securing the cover to a static structure of the truck bed.

In a further non-limiting embodiment of the foregoing tonneau cover system, wherein the support bracket comprises a plurality of support brackets corresponding to each of the plurality of cover sections.

In a further non-limiting embodiment of the foregoing tonneau cover system, wherein the support bracket includes a slot enabling movement of the support bracket from an inboard position supporting the cover and an outboard position enabling movement of the cover into the truck bed.

In a further non-limiting embodiment of the foregoing tonneau cover system, wherein the support bracket includes a support surface moveable between the inboard position and the outboard position.

In a further non-limiting embodiment of the foregoing tonneau cover system, wherein the support bracket comprises a rotating rail that is rotatable from the first position within the truck bed providing support for the cover to the second position outside the truck bed enabling movement of the cover into the truck bed.

In a further non-limiting embodiment of the foregoing tonneau cover system, wherein the rotating rail is pivotally attached to side walls of the truck bed and includes a spring and a tab holding the rotating rail in one of the first position and the second position.

A vehicle cargo area according to another exemplary aspect of the present disclosure includes, among other things, sidewalls extending vertically upward relative to a bottom surface defining a cargo area between the sidewalls, a support bracket supported on a top surface of each sidewall movable between a first position and a second position, and a cover supported above the cargo area when the support bracket is in the first position and movable into the cargo area when the support bracket is in the second position.

In a further non-limiting embodiment of the foregoing vehicle cargo area, wherein the cover comprises a plurality of separate cover sections secured to each other with a hinge.

In a further non-limiting embodiment of any of the foregoing vehicle cargo areas, wherein the support bracket comprises a plurality of support brackets corresponding to each of the plurality of cover sections.

In a further non-limiting embodiment of any of the foregoing vehicle cargo areas, wherein the support bracket includes a slot enabling movement of the support bracket from an inboard position supporting the cover and an outboard position enabling movement of the cover into the cargo area and a support surface moveable between the inboard position and the outboard position.

In a further non-limiting embodiment of any of the foregoing vehicle cargo areas, wherein the support bracket comprises a rotating rail pivotally attached to the sidewalls for rotation from the first position within the cargo area providing support for the cover to the second position outside the truck bed enabling movement of the cover into the cargo area.

In a further non-limiting embodiment of any of the foregoing vehicle cargo areas, wherein the cover comprises a plurality of separate cover sections secured to each other with a hinge.

In a further non-limiting embodiment of any of the foregoing vehicle cargo areas, wherein at least one of the cover sections includes a lock securable to a fixed structure defining the cargo area.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 is a schematic view of an example bracket of the cover system.

FIG. 4 is a schematic view of the example cover system.

FIG. 5 is a schematic view of the example cover system.

FIG. 6 is an example view of cover sections of the example cover system.

FIG. 7 is an example view of U-pin for the example cover system.

FIG. 16 is a perspective view of another example bracket assembly.

FIG. 17a is a schematic view of a pivoting rail assembly.

FIG. 17b is an example view of the rail assembly in an initial position for movement from a first position.

FIG. 17c is another example schematic view of the rail assembly moved to a support position.

FIG. 17d is a schematic view of the rail assembly in a locked position and in the support position.

FIG. 18 is a schematic view of the example rail assembly in a position allowing the cover section to divide a portion of the cargo bed.

FIG. 19 is a top view of the rail assembly.

FIG. 20 is a schematic view of the example rail assembly in a position supporting the cover sections.

FIG. 21 is a top schematic view of the cover section supported on the rail assembly.

DETAILED DESCRIPTION

Figure 1:
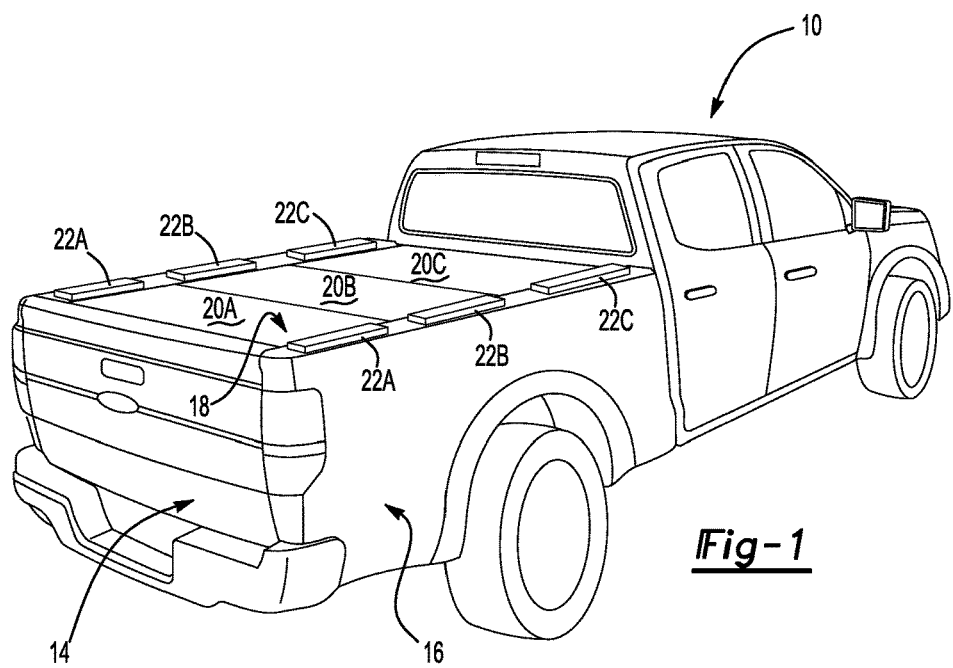
FIG. 1 is a perspective view of a pick-up truck cargo bed including an example cover system.

Referring to FIG. 1, an example truck 10 is illustrated and includes a truck bed 12 defined between side wall 16 and a movable tailgate 14. The example truck bed 12 is covered by a cover system 18. The cover system 18 includes cover sections 20a-c. The cover sections 20a-c are movable from a covered position illustrated in FIG. 1 and a dividing position extending downward within the cargo bed 12. The cover sections 20a-c are supported by brackets 22a-c disposed on either side of the cargo bed 12. The brackets 22a-c are all movable from a first position supporting the corresponding cover section 20a-c and a second position that allows the cover section to be moved downward into a position dividing the cargo bed 12.

Figure 2:
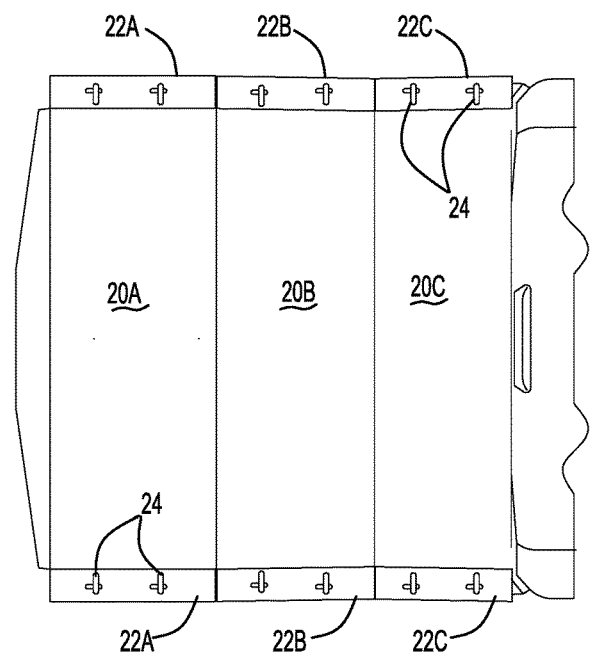
FIG. 2 is an over the top view of the example cover system.

Referring to FIGS. 2 and 3 with continued reference to FIG. 1, the example cover system 18 includes three cover sections 20a, 20b, and 20c. Each of the cover sections 20a-c are supported by a corresponding bracket 22a, 22b, and 22c. Each of the brackets 22a, 22b, and 22c includes a sliding portion provided by a slot 24 and a support portion 26. A fastener or pin 28 is disposed within the slot 24 and attaches to a side wall 16 of the cargo bed 12. The fastener 28 maybe tightened to secure the bracket 22 in place. The fastener 28 could require a tool to tighten or may have a configuration that enables tightening by hand.

Referring to FIGS. 4 and 5 with continued reference to FIG. 3, the brackets 22a-c are movable relative to the side wall 16 of the cargo bed 12 to move the support portion 26 from a first position, shown in FIG. 5, that supports the corresponding cover section 22a-c and a second position, show in FIG. 4, that enables the corresponding cover section 20a-c to be moved to divide the cargo bed 12. In this disclosed embodiment, each of the brackets 22a-c includes two slots 24 that are engaged in the fasteners pin 28. Movement of the brackets 22a-c between the first inboard position and the second outboard position provides for support or movement of the cover section into the cargo bed 12.

Referring to FIGS. 6 and 7, the example cover system 18 includes the cover sections 20a, 20b and 20c that are connected together by a hinge 34. The hinge 34 enables the cover sections 20a, 20b and 20c to be moved relative to each other and also enables folding onto each other. In one disclosed embodiment, the hinges 34 comprise a U-pin 36 as is illustrated in FIG. 7. The U-pin 36 is inserted into sides of corresponding cover sections 20a, 20b and 20c such that each of the cover sections 20a-c may rotate about longitudinal sides relative to each other. The U-pin 36 enables each of the cover sections 20a-c to fold onto an adjacent cover section 20a-c. Accordingly, the U-pin 36 provides several options for movement of the cover sections 20a, 20b and 20c relative to each other to cover and secure portions of the cargo bed 12.

Figure 8:
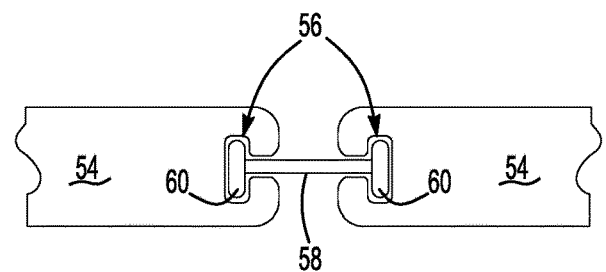
FIG. 8 is an example view another example hinged attachment embodiment.

Referring to FIG. 8, another example hinge embodiment is illustrated and includes a flexible member 58 that extends between cover sections 54. The cover sections 54 include a slot 56 that receives tabs 60 on opposing sides of the flexible member 58. The flexible member 58 provides for movement and positioning of the cover sections 54 relative to each other. In this example, the flexible member 58 is fabricated from a flexible rubber material, however any flexible material that enables relative orientation between the cover sections 54 while maintaining securement may be used and is within the contemplation of this disclosure.

Figure 9:
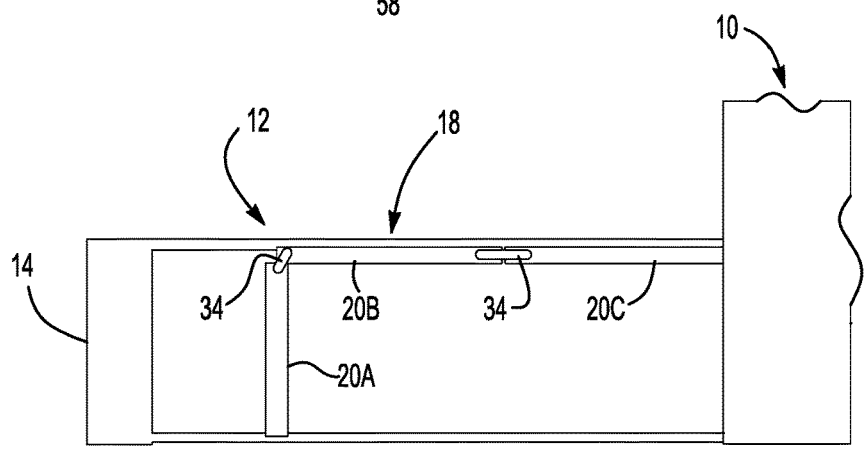
FIG. 9 is a schematic view of the example cover system in a position with one cover section in a secured position.
Figure 10:
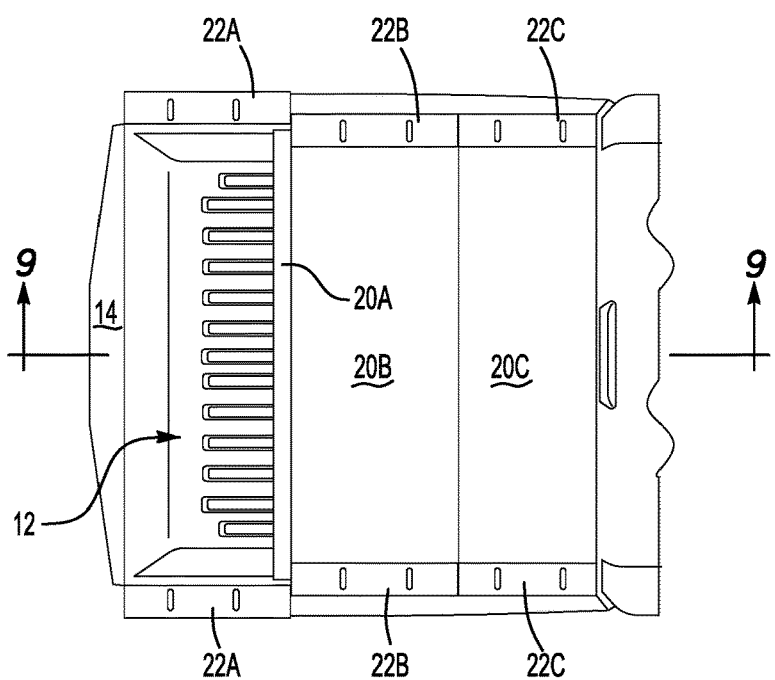
FIG. 10 is an overhead view of the example truck bed with one cover section in a secured position.

Referring to FIGS. 9 and 10, the example cover system 18 is illustrated with cover section 20a rotated downward in a vertical orientation from the cover section 20b. In this orientation, the cover section 20a provides for securement of objects within the space defined within the cover sections 20b and 20c. The brackets 22a are moved outboard to the second position to enable movement of the cover section 20a to the vertical orientation illustrated in FIG. 9. In this position, the brackets 22b and 22c on either side of the cover sections 20b and 20c are in an inboard position supporting the cover system 18. This orientation provides an area within the cargo bed 12 that is accessible without going underneath the covered sections 20a-c and also provides a secured section within the cover sections 20b, 20c.

Figure 11:
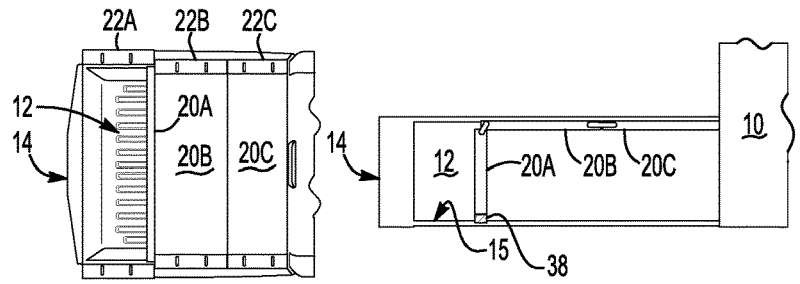
FIG. 11 is a schematic view of the example cover system with one cover section in a downward secured position.

Referring to FIG. 11, the cover system 18 is shown in an orientation similar to that shown in FIGS. 9 and 10 where the cover section 20a is in a vertical orientation and still connected to the cover sections 20b and 20c. In this embodiment, the cover section 20a is locked by a lock 38 to a bottom surface 15 of a cargo bed 12. The disclosed lock 38 can be of any configuration that is secured and openable by a key, combination or other unique structure to control access to the secured area within the cover section 20b and 20c. The bottom surface 15 includes a corresponding surface that is selectively engageable to secure the cover section 20a in place.

Figure 12:
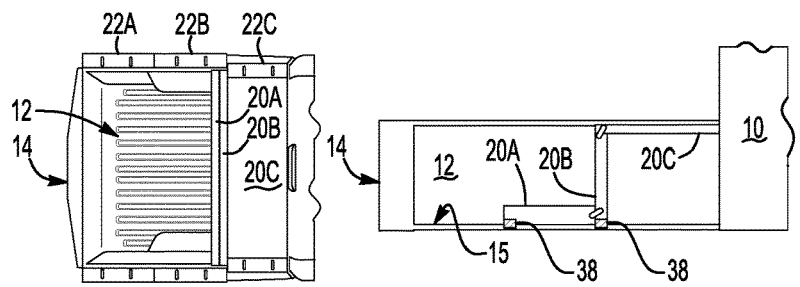
FIG. 12 is another schematic view of the example cover system with two cover sections in a downward secured position.

Referring to FIG. 12, another orientation of the cover system 18 is illustrated where the cover section 20a is disposed on a bottom surface 15 of the cargo bed 12. The cover section 20b is in a vertical orientation extending between the cover section 20a and the cover section 20c. In this orientation, the cover section 20a is locked by a forward located lock 38 and also by a second aft located lock 38 at the joint between the cover sections 20a and 20b. In this orientation, a secured area is provided under the cover section 20c. The remainder of the cargo bed 12 is open and accessible. The use of the two locks 38 at the forward edge and rear edge of the cover 20a secures the cover system 18 within the cargo bed 12 such that it may not be removed or tampered with.

Figure 13:
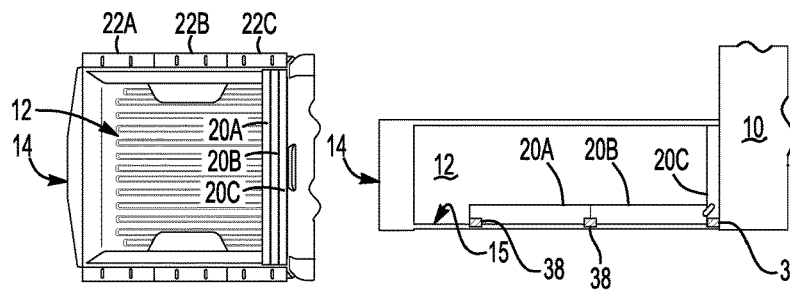
FIG. 13 is a schematic view of the example cover system with each of the cover sections in a secured position.

Referring to FIG. 13, another cover system orientation is disclosed where the cover 18 is partially disposed on the bottom surface with one cover section 20c disposed against a back wall or cab of the truck bed. In this orientation, locks 38 are disposed at each of the joints to hold the cover sections 20a and 20b to the bottom 15 of the truck bed. Holding the cover sections 20a, 20b to the bottom surface 15 of the truck bed secures the cover 18 to prevent tampering and also provides access to the remaining portions of the cargo bed 12. In this orientation, the cover sections 20a and 20b are on the bottom surface 15 and secured in place by a lock.

Figure 14:
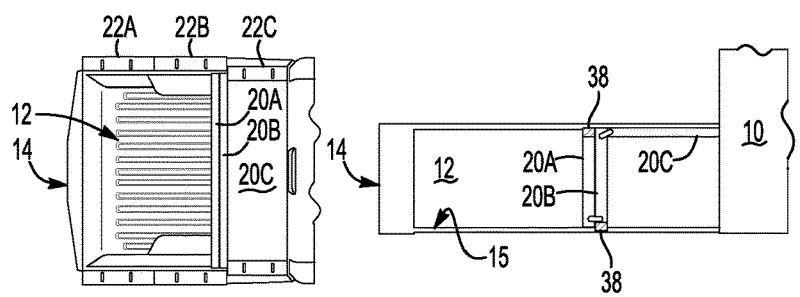
FIG. 14 is another schematic view of the example cover system with a portion of the cover covering the cargo bed and a portion secured to provide an open space in the cargo bed.

Referring to FIG. 14, another cover system orientation is disclosed where the cover sections 20a and 20b are folded onto each other and secured together by locks 38 at each end as shown. In this orientation, the cover section 20c is supported above the cargo area 12 and provides a secured area underneath. The cover sections 20a and 20b are folded onto each other to provide a more compact division while leaving the bottom surface 15 of the cargo bed 12 open and accessible for supporting objects.

Figure 15:
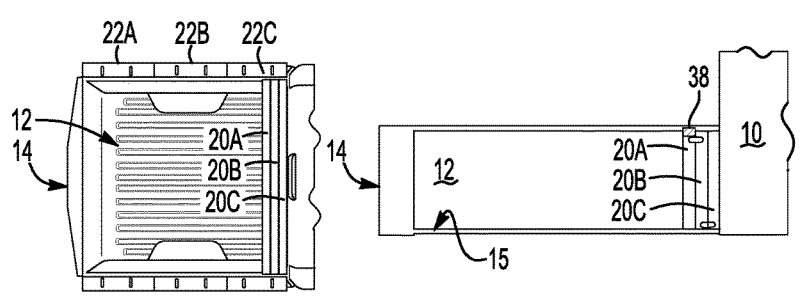
FIG. 15 is another schematic view of the example cover system in a stowed position.

FIG. 15 is yet another orientation of the cover section that provides for stowage of the cover sections 20a-c when not in use. In the orientation shown in FIG. 15 each of the cover sections 20a, 20b and 20c are folded onto each other and stacked against a forward cabin within the cargo bed 12. A lock 38 is provided between the cover sections 20a and 20b along to provide for storage of the cover system 18 within the cargo bed 12 when not in use.

Referring to FIG. 16, another example bracket assembly 40 is illustrated for supporting the cover system 18 either above the cargo bed 12 or in a position partitioning the cargo bed 12. A rotating rail 42 is supported on side walls 16 of the truck bed. The rail 42 is secured to a pivoting member 44 by a spring 48. The rail 42 includes tabs 50 that engage catches 52 defined within the side wall 16. The pivot portion 44 pivots about a pivot axis 46.

Referring to FIGS. 17a-c the rail assembly 40 is shown in an initial position (FIG. 17a) that does not support cover sections 20a-c of the cover system 18. In the position shown in FIG. 17a, the rail 42 is out of the way and does not obstruct movement of cover sections 20a-c into a portioning position inside the cargo bed 12.

Referring to FIGS. 17b, 17c and 17d, when it is desired to move the rail assembly 40 to a position that supports the cover system, the rail 42 is lifted upward and released from the catches 52. The tabs 50 are released by lifting of the rail 42 upwardly against the biasing force provided by the spring 48. The spring 48 attaches the rail 42 to the pivot member 44. Once the rail 42 is raised upwardly and the tabs 50 are free from the catches 52, the rail 42 may rotate downwardly as is indicated in FIG. 17c. The tabs 50 engage catches 52 only in positions desired for the rail 40 to be placed. In this embodiment, the rail 42 is placed in either the position indicated in FIG. 17a or the position indicated at 17d to support the tonneau cover system 18.

Upon rotation of the rail 42 to the support position illustrated in FIG. 17c, the rail 42 can be released such that biasing spring 48 draws the rail 42 inward towards the truck side wall 16 to engage the tabs 50 with the corresponding catch 52. In the position shown in FIG. 17d, the cover sections 20a-c are supported on a top most surface of the rail 42.

Referring to FIGS. 18 and 19, the example rail assembly 40 is illustrated in a position where the cover section 20 may extend downward vertically within the cargo bed and side wall 16.

Referring to FIGS. 20 and 21, the rail assembly 40 is shown in a position providing support for the cover section 20. In this position, each of the rail assemblies 40 are pivoted downward and into the cargo bed 12 such that upper most surfaces support corresponding cover sections 20a-c over the cargo bed 12

In this example embodiment, there are separate rotatable rail assemblies 40a, 40b and 40c (FIG. 21) for each corresponding cover section 20a, 20b, 20c such that the covers may be placed in a desired orientation as illustrated in FIGS. 17a-c. Moreover, each of the cover sections 20a-c are lockable in the disclosed and shown orientations.

Accordingly, the example tonneau cover support system provides for supporting the cover in a secured position covering the cargo bed and various other orientations where partial portions of the cargo bed are covered and other portions are accessible without reaching under the cargo tonneau cover.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A tonneau cover system for a truck bed comprising:
a cover comprising a plurality of separate cover sections secured to each other with a corresponding plurality of hinges; and
a support bracket disposed on each side of the cover and movable between a first position supporting the cover above a truck bed and a second position enabling movement of the cover into the truck bed.

2. The tonneau cover system as recited in claim 1, wherein the plurality of hinges each comprise a U-pin such that adjacent cover sections are foldable onto each other.

3. The tonneau cover system as recited in claim 1, wherein the corresponding plurality of hinges each comprise a flexible member extending between cover sections.

4. The tonneau cover system as recited in claim 1, wherein at least one of the cover sections includes a lock securing the cover to a static structure of the truck bed.

5. The tonneau cover system as recited in claim 1, wherein the support bracket comprises a plurality of support brackets corresponding to each of the plurality of cover sections.

6. A tonneau cover system for a truck bed comprising:
a cover; and
a support bracket disposed on each side of the cover and movable between a first position supporting the cover above a truck bed and a second position enabling movement of the cover into the truck bed, wherein the support bracket includes a slot enabling movement of the support bracket from an inboard position supporting the cover to an outboard position enabling movement of the cover into the truck bed.

7. The tonneau cover system as recited in claim 6, wherein the support bracket includes a support surface moveable between the inboard position and the outboard position.

8. The tonneau cover system as recited in claim 1, wherein the support bracket comprises a rotating rail that is rotatable from the first position within the truck bed providing support for the cover to the second position outside the truck bed enabling movement of the cover into the truck bed.

9. The tonneau cover system as recited in claim 8, wherein the rotating rail is pivotally attached to side walls of the truck bed and includes a spring and a tab holding the rotating rail in one of the first position and the second position.

10. A vehicle cargo area comprising:
sidewalls extending vertically upward relative to a bottom surface defining a cargo area between the sidewalls;
a support bracket supported on a top surface of each sidewall movable between a first position and a second position; and
a plurality of separate cover sections secured to each other with a corresponding plurality of hinges supported above the cargo area when the support bracket is in the first position and movable into the cargo area when the support bracket is in the second position.

11. The vehicle cargo area as recited in claim 10, wherein the support bracket comprises a plurality of support brackets corresponding to each of the plurality of cover sections.

12. The vehicle cargo area as recited in claim 10, wherein the support bracket includes a slot enabling movement of the support bracket from an inboard position supporting the cover to an outboard position enabling movement of the cover into the cargo area and a support surface moveable between the inboard position and the outboard position.

13. The vehicle cargo area as recited in claim 10, wherein the support bracket comprises a rotating rail pivotally attached to the sidewalls for rotation from the first position within the cargo area providing support for the cover to the second position outside the truck bed enabling movement of the cover into the cargo area.

14. The vehicle cargo area as recited in claim 10, wherein at least one of the cover sections includes a lock securable to a fixed structure defining the cargo area.

* * * * *